(12) United States Patent
Salah et al.

(10) Patent No.: US 11,184,892 B2
(45) Date of Patent: Nov. 23, 2021

(54) ENHANCEMENT OF NEW RADIO PUSCH FOR URLLC IN MOBILE COMMUNICATIONS

(71) Applicant: MediaTek Singapore Pte. Ltd., Singapore (SG)

(72) Inventors: Abdellatif Salah, Cambridge (GB); Mohammed S Aleabe Al-Imari, Cambridge (GB)

(73) Assignee: MediaTek Singapore Pte. Ltd., Singapore (SG)

(*) Notice: Subject to any disclaimer, the term of this patent is extended or adjusted under 35 U.S.C. 154(b) by 107 days.

(21) Appl. No.: 16/672,811

(22) Filed: Nov. 4, 2019

(65) Prior Publication Data

US 2020/0145999 A1   May 7, 2020

Related U.S. Application Data

(60) Provisional application No. 62/755,587, filed on Nov. 5, 2018.

(51) Int. Cl.
*H04W 72/04* (2009.01)

(52) U.S. Cl.
CPC ..... *H04W 72/0446* (2013.01); *H04W 72/042* (2013.01)

(58) Field of Classification Search
CPC ............ H04W 72/0446; H04W 72/042; H04L 1/1819
See application file for complete search history.

(56) References Cited

U.S. PATENT DOCUMENTS

| 2011/0103247 A1* | 5/2011 | Chen | H04L 5/0057 370/252 |
| 2011/0300872 A1* | 12/2011 | Lim | H04L 1/0606 455/450 |

(Continued)

OTHER PUBLICATIONS

China National Intellectual Property Administration, International Search Report and Written Opinion tor PCT/CN2019/115601, dated Jan. 17, 2020.

(Continued)

*Primary Examiner* — Fahmida S Chowdhury
(74) *Attorney, Agent, or Firm* — Han IP PLLC; Andy M. Han

(57) ABSTRACT

Various examples and schemes pertaining to enhancement of New Radio (NR) physical uplink shared channel (PUSCH) for ultra-reliable low-latency communication (URLLC) in mobile communications are described. An apparatus determines whether to apply a cyclic delay diversity (CDD) scheme for a PUSCH transmission. The apparatus performs the PUSCH transmission to a network node of a wireless network with the CDD scheme applied responsive to determining that the CDD scheme is to be applied. Optionally, the apparatus receives a signaling from the network node indicating information related to mini-slot repetition such that the apparatus performs the PUSCH transmission with at least one symbol repeated in multiple mini-slots within a slot. Optionally, the apparatus also performs a transport block size (TBS) calculation for the PUSCH transmission with an assumption of no demodulation reference signal (DMRS) in the TBS calculation.

17 Claims, 7 Drawing Sheets

(56) References Cited

U.S. PATENT DOCUMENTS

| | | | |
|---|---|---|---|
| 2014/0016714 A1* | 1/2014 | Chen | H04W 24/02 |
| | | | 375/260 |
| 2018/0167183 A1* | 6/2018 | Zhang | H04L 1/0027 |
| 2018/0295651 A1 | 10/2018 | Cao et al. | |
| 2019/0081675 A1* | 3/2019 | Jung | H04W 56/001 |
| 2019/0296861 A1* | 9/2019 | Zou | H04L 1/08 |
| 2019/0342921 A1* | 11/2019 | Loehr | H04L 5/0053 |
| 2020/0052827 A1* | 2/2020 | Vilaipornsawai | H04L 1/189 |

OTHER PUBLICATIONS

Panasonic, On NR URLLC L1 enhancements, 3GPP TSG RAN WG1 Meeting #94, R1-1808827, Gothenburg, Sweden, Aug. 20-24, 2018.

Mediatek Inc., Enhancements of NR PUSCH for URLLC, 3GPP TSG RAN WG1 Meeting #95, Spokane, USA, Nov. 12-16, 2018.

* cited by examiner

500

DETERMINE, BY A PROCESSOR OF AN APPARATUS, WHETHER TO APPLY A CYCLIC DELAY DIVERSITY (CDD) SCHEME FOR A PHYSICAL UPLINK SHARED CHANNEL (PUSCH) TRANSMISSION
510

PERFORM, BY THE PROCESSOR, THE PUSCH TRANSMISSION TO A NETWORK NODE OF A WIRELESS NETWORK WITH THE CDD SCHEME APPLIED RESPONSIVE TO DETERMINING THAT THE CDD SCHEME IS TO BE APPLIED
520

FIG. 5

ENHANCEMENT OF NEW RADIO PUSCH FOR URLLC IN MOBILE COMMUNICATIONS

CROSS REFERENCE TO RELATED PATENT APPLICATION(S)

The present disclosure is part of a non-provisional application claiming the priority benefit of U.S. Patent Application No. 62/755,587, filed on 5 Nov. 2018, the content of which being incorporated by reference in its entirety.

TECHNICAL FIELD

The present disclosure is generally related to mobile communications and, more particularly, to techniques pertaining to enhancement of New Radio (NR) physical uplink shared channel (PUSCH) for ultra-reliable low-latency communication (URLLC) in mobile communications.

BACKGROUND

Unless otherwise indicated herein, approaches described in this section are not prior art to the claims listed below and are not admitted as prior art by inclusion in this section.

In Release 15 (Rel-15) of the $3^{rd}$ Generation Partnership Project (3GPP) specification, multiple mechanisms were specified for improvement of PUSCH reliability and latency such as a new modulation coding scheme (MCS) table, slot aggregation for reliability, and support of mini-slot (PUSCH mapping type B) where the length of the PUSCH can be one through fourteen symbols and the starting symbol can be any position within a slot as a useful latency enhancement. However, there is still room for improvement in areas such as support of intra-slot mini-slot repetition and UL diversity schemes such as cyclic delay diversity (CDD), which are needed for URLLC use-cases to improve latency, reliability and spectral efficiency.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

In one aspect, a method may involve a processor of an apparatus determining whether to apply a CDD scheme for a PUSCH transmission. The method may also involve the processor performing the PUSCH transmission to a network node of a wireless network with the CDD scheme applied responsive to determining that the CDD scheme is to be applied.

In one aspect, a method may involve a processor of an apparatus receiving a signaling from a network node of a wireless network indicating information related to mini-slot repetition. The method may also involve the processor performing a PUSCH transmission to the network node with at least one symbol repeated in multiple mini-slots within a slot.

In one aspect, a method may involve a processor of an apparatus determining whether to apply a CDD scheme for a PUSCH transmission. The method may also involve the processor receiving a signaling from a network node of a wireless network indicating information related to mini-slot repetition. The method may further involve the processor performing a transport block size (TBS) calculation for the PUSCH transmission with an assumption of no demodulation reference signal (DMRS) in the TBS calculation. The method may additionally involve the processor performing the PUSCH transmission to the network node with the CDD scheme applied responsive to determining that the CDD scheme is to be applied and with at least one symbol repeated in multiple mini-slots within a slot.

It is noteworthy that, although description provided herein may be in the context of certain radio access technologies, networks and network topologies such as Ethernet, the proposed concepts, schemes and any variation(s)/derivative(s) thereof may be implemented in, for and by other types of radio access technologies, networks and network topologies such as, for example and without limitation, 5th Generation (5G), NR, Long-Term Evolution (LTE), LTE-Advanced, LTE-Advanced Pro, narrowband (NB), narrowband Internet of Things (NB-IoT), Wi-Fi and any future-developed networking and communication technologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 5 is a flowchart of an example process in accordance with an implementation of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to enhancement of NR PUSCH for URLLC in mobile communications. According to the present disclosure, a number of possible solutions may be implemented separately or jointly. That is, although these possible solutions may be described below separately, two or more of these possible solutions may be implemented in one combination or another.

Figure 1:
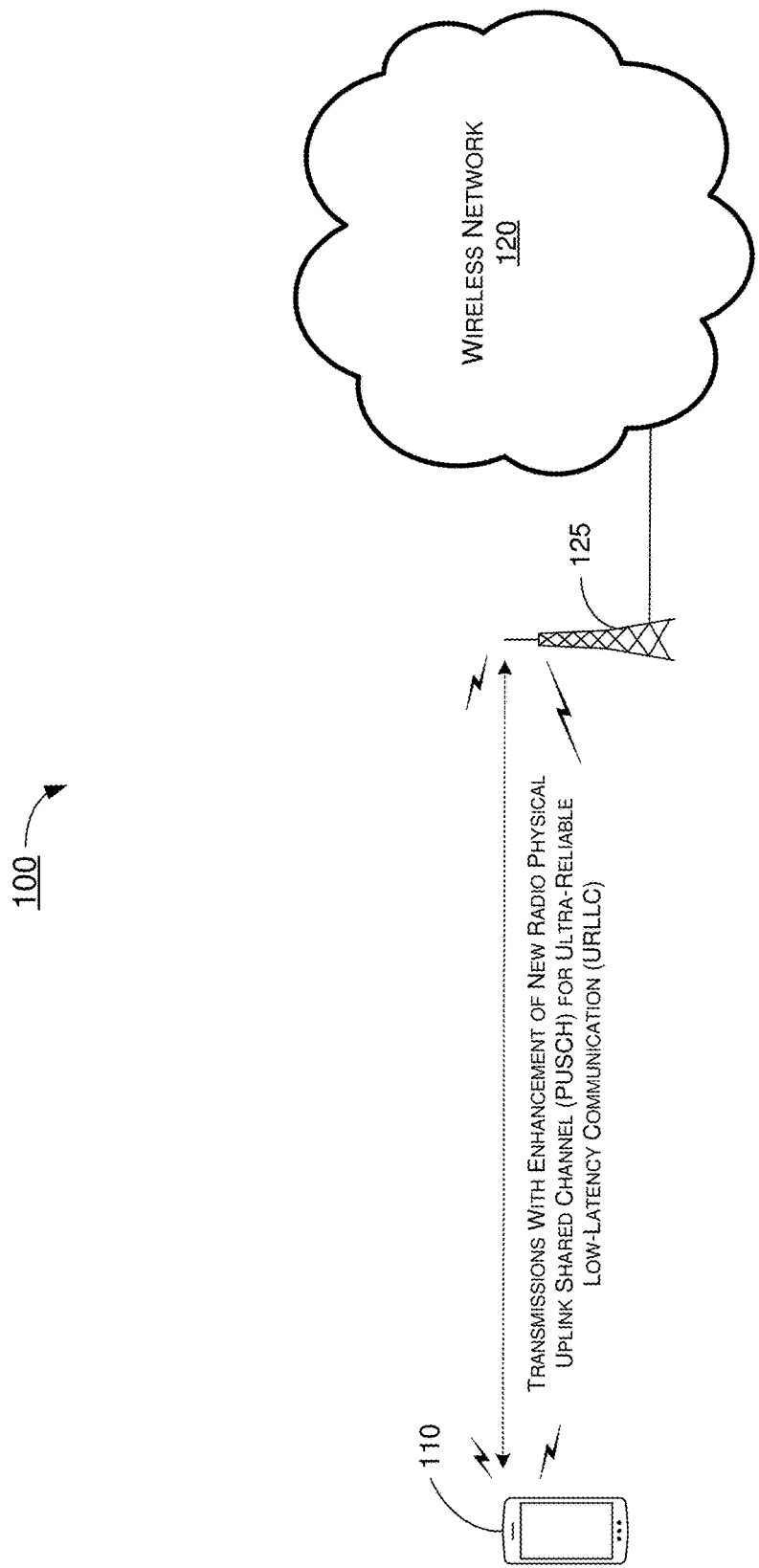
FIG. 1 is a diagram of an example network environment in which various solutions and schemes in accordance with the present disclosure may be implemented.
Figure 2:
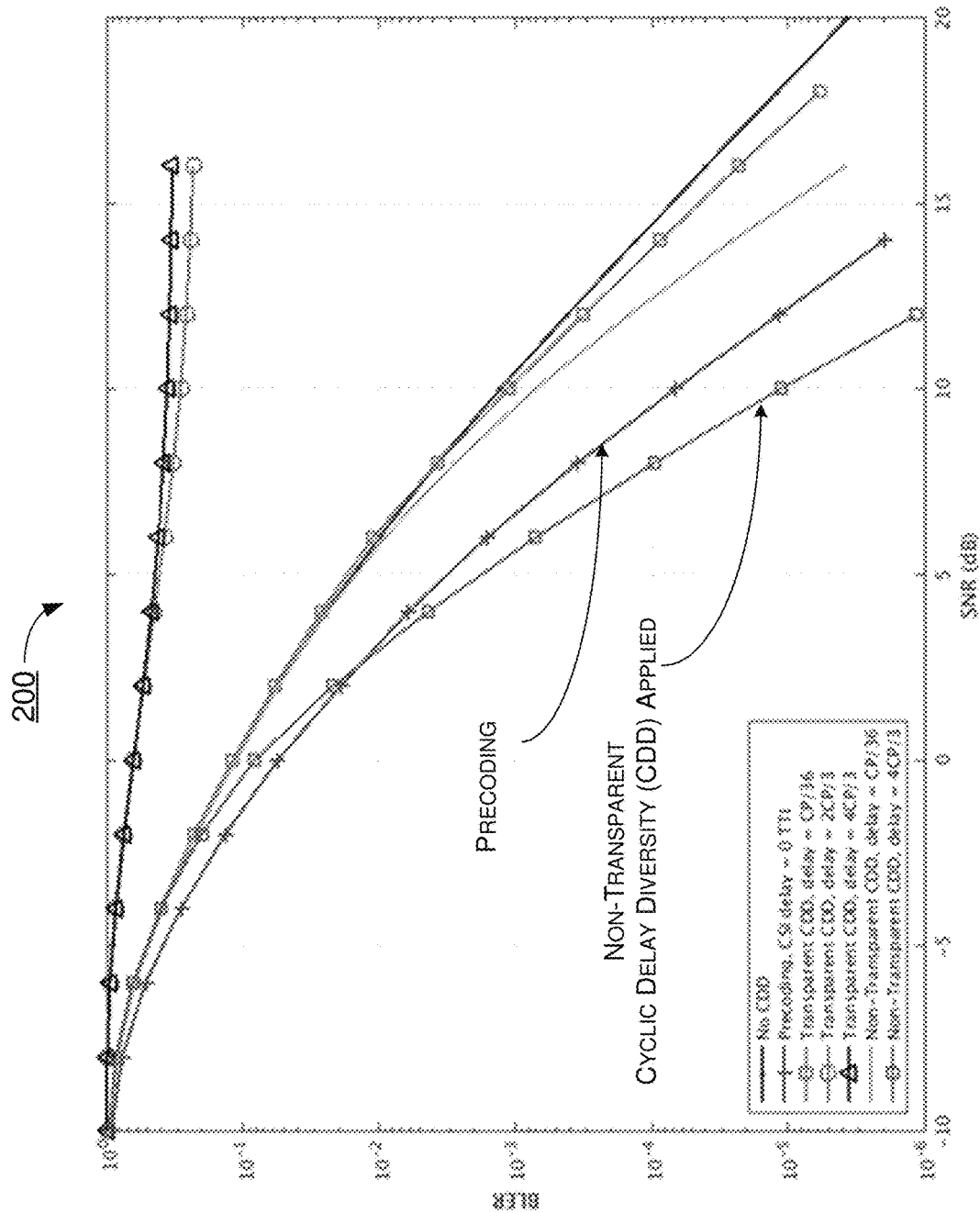
FIG. 2 shows an example scenario in accordance with an implementation of the present disclosure.
Figure 3:
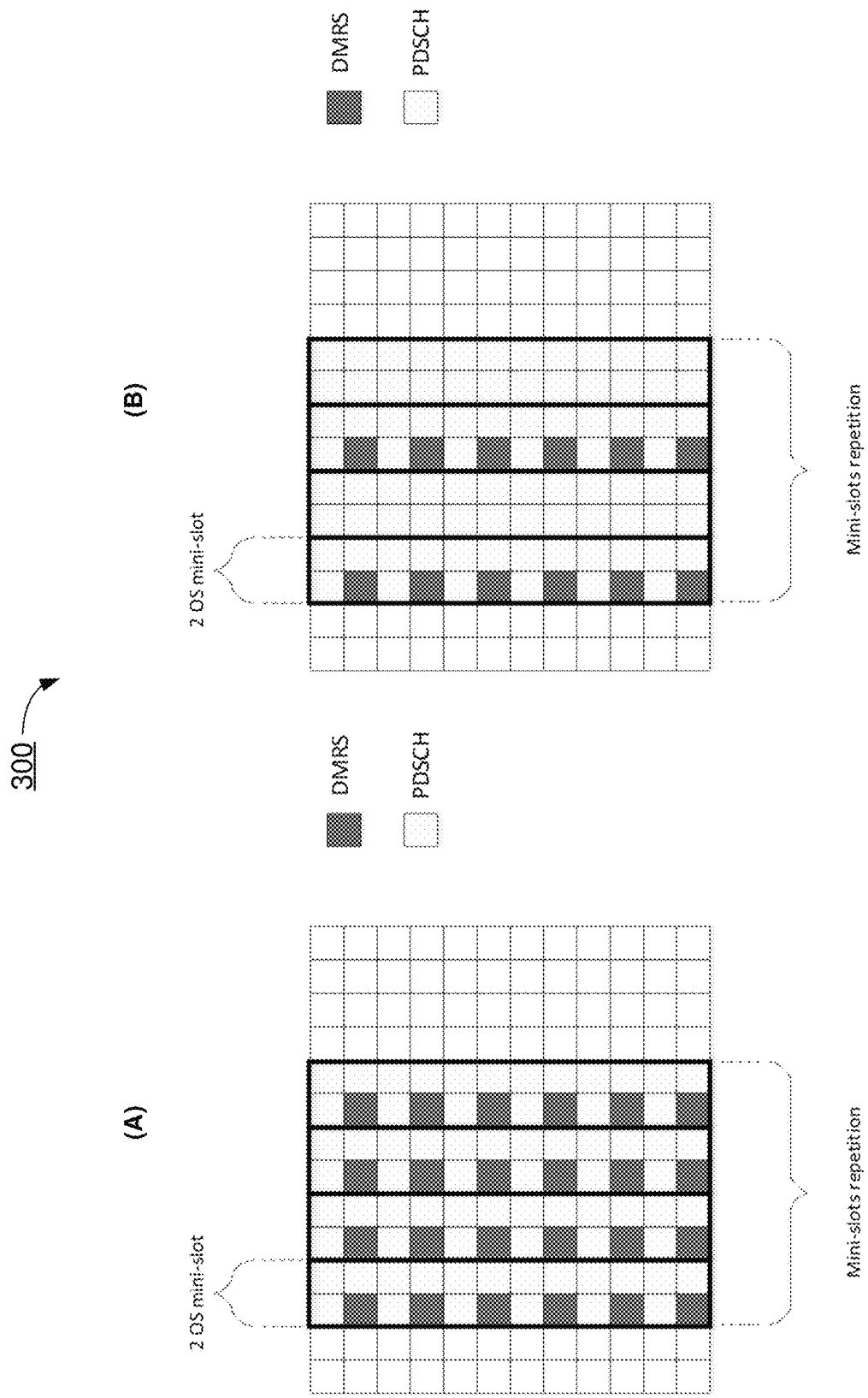
FIG. 3 shows an example scenario in accordance with an implementation of the present disclosure.

FIG. 1 illustrates an example network environment 100 in which various solutions and schemes in accordance with the present disclosure may be implemented. FIG. 2 and FIG. 3 illustrate example scenarios 200 and 300, respectively, in accordance with implementations of the present disclosure. Each of scenarios 200 and 300 may be implemented in network environment 100. The following description of various proposed schemes is provided with reference to FIG. 1~FIG. 3.

Referring to FIG. 1, network environment 100 may involve a UE 110 in wireless communication with a wireless network 120 (e.g., a 5G NR mobile network). UE 110 may initially be in wireless communication with wireless network 120 via a base station or network node 125 (e.g., an eNB, gNB or transmit-receive point (TRP)). In network environment 100, UE 110 and wireless network 120 may implement various schemes pertaining to enhancement of NR PUSCH for URLLC in mobile communications in accordance with the present disclosure, as described herein.

With respect to transmit diversity for URLLC UL transmissions, NR data UL transmission has precoding schemes to enhance performance, particularly for channels with short delay spread and low mobility. On the other hand, according to simulation, it may be demonstrated that a transmit diversity scheme (e.g., non-transparent CDD) may outperform precoding in case the targeted error rate is lower than $10^{-2}$. FIG. 2 shows a diagram of example scenario 200 in which the channel setting is perfect for precoding. However, the block error rate (BLER) curve slope of CDD is more decent and shows potential advantage in case BLER is $10^{-3}$ or lower. For URLLC applications operating at very low BLER target, there may still be room for enhancement of the transmission scheme.

Regarding comparison between precoding and a transmit diversity scheme (e.g., non-transparent CDD), with CDD delay confined to about one-fifth cyclic precoding (CP), it can be observed that precoding can be better than or comparable to CDD for BLER down to $10^{-2}$. The slope of CDD can become steeper with CDD delay increased to about one-third CP. In FIG. 2 no delay value is included as there is loss in channel estimation performance due to excessive delay spread which may not bring better performance than a shorter CDD delay at BLER of $10^{-2}$. Nevertheless, in case the BLER slope is the key for performance at BLER of $10^{-5}$, a larger CDD delay may be considered in various implementations.

Thus, under various proposed schemes in accordance with the present disclosure, a CDD scheme (e.g., non-transparent CDD) may be applied in UL transmissions (e.g., PUSCH) for URLLC to enhance UL transmit diversity. Under a proposed scheme, use or application of CDD (e.g., non-transparent CDD) may be limited to grant-based or configured grant. Under a proposed scheme, use or application of CDD (e.g., non-transparent CDD) may be limited to a certain targeted reliability. Under a proposed scheme, use or application of CDD (e.g., non-transparent CDD) may be limited to certain MCS table(s). Under a proposed scheme, use or application of CDD (e.g., non-transparent CDD) may be limited to certain radio network temporary identifier(s) (RNTI(s)). For instance, use or application of CDD (e.g., non-transparent CDD) may be limited to a new MCS-RNTI. Under a proposed scheme, use or application of CDD (e.g., non-transparent CDD) for UL transmissions may be defined as a UE feature or a UE capability of UE 110.

With respect to signaling for aggregation type, under Rel-15 of the 3GPP specification, when UE 110 is configured with aggregationFactorDL>1, the same symbol and resource block (RB) allocation is applied across a number of consecutive slots equal to aggregationFactorDL. UE 110 may expect that the transport block (TB) is repeated within each symbol allocation among each of the aggregationFactorDL consecutive slots. Aggregation factor 1, 2, 4 or 8 is semi-statically configured separately (e.g., not part of a table). In Rel-15, the number of repetition for data corresponds to the layer 1 (L1) parameter "aggregation-factor-DL" and when this field is absent UE 110 applies the value of 1, which means the repetition is disabled. UE 110 may be radio resource control (RRC)-configured with aggregationFactorDL for downlink (DL) transmissions and aggregationFactorUL for UL transmissions.

In Rel-16 of the 3GPP specification, mini-slot repetition intra-slot and inter-slot could be introduced. This mechanism is different to the Rel-15 mini-slot/slot aggregation. Therefore, the differentiation between the two mechanisms should be captured in the 3GPP specification and signaled to UE 110.

Under a proposed scheme in accordance with the present disclosure, to indicate to UE 110 the mini-slot repetition, multiple options may be adopted by wireless network 120. Under a first option (option 1), a separate RRC (or dynamic) parameter may be defined, which may be called repetitionFactor for example, and may operate similarly as aggregationFactor. This parameter (repetitionFactor) may indicate the number of contiguous or non-contiguous repetitions intra-slot or inter-slot. When this field is absent, UE 110 may apply the value 1. The new repetition factor may have different possible values than aggregationFactor. With option 1, the new Rel-16 repetition factor and Rel-15 aggregationFactor may be enabled simultaneously unless a restriction to discard this possibility is specified.

Under a second option (option 2), the Rel-15 parameter aggregationFactor may be re-used for mini-slot repetition. A new RRC (or dynamic) parameter may be defined to differentiate between the Rel-15 aggregation and the Rel-16 mini-slot repetition. With option 2, the new Rel-16 repetition factor and Rel-15 aggregationFactor may not be enabled simultaneously since once single RRC flag would be used to switch between them.

Regarding the repetition pattern, there may be two options under the proposed scheme. For instance, the repetitions may be contiguous repetitions (e.g., back-to-back repetitions). Alternatively, the repetitions may be non-contiguous repetitions. In an event that non-contiguous repetition is supported, a repetition offset may be defined and signaled by network node 125 to UE 110 (e.g., RRC or dynamically) to indicate the offset between adjacent repetitions in terms of a number of orthogonal frequency-divisional multiplexing (OFDM) symbols. The offset may be defined as the number of symbols between a last symbol of one repetition and a first symbol of an immediately subsequent repetition or as the offset between starting symbols of two successive repetitions.

The non-contiguous repetition may be useful to add more flexibility to support early termination and, hence, improve the resource efficiency (but may impact latency). Under the proposed scheme, DMRS sharing may be disabled for non-contiguous repetitions. In an event that semi-static UL/DL assignment configuration shows a conflict with scheduled repetitions, the repetitions in conflict may be omitted in the counting rather than postponed.

Regarding redundancy version (RV) indices, there may be different options under the proposed scheme in an event that all the repetitions are scheduled with the same single downlink control information (DCI) signaling. For instance, the RV field in the DCI may be utilized for scheduling the transmission to indicate the RV of the first repetition and the subsequent repetitions will cycle through the RV in order 0, 2, 3, 1 starting from the RV indicated in the DCI. Alternatively, RV indices may be fixed to 0→2→3→1 all the time and the RV index in the DCI signaling may not be necessary. This may help reduce the DCI size (for compact DCI) and the RV bitfield may no longer be needed. It is noteworthy that, regarding crossing a slot boundary, the repetitions may be allowed to cross a slot boundary and the scrambling for this mini-slot DMRS may be clarified.

Support of mini-slot repetition in the same slot (or even crossing slot boundaries) may be an important enhancement as it allows for multiple transmission opportunities of the same TB in the same slot. This may further improve the reliability and latency, as well as help meeting URLLC requirements. However, when mini-slots are used (e.g., two orthogonal-symbol (OS) mini-slots) and when repetitions within the same slot are allowed, the repetitions may use the same DMRS configuration. This may lead to a very high DMRS overhead which is sub-optimal and not necessarily needed to meet targeted performance even for fading channels or high mobility.

Thus, under a proposed scheme in accordance with the present disclosure, DMRS sharing between the repetitions may be utilized to reduce DMRS overhead. Under the proposed scheme, DMRS may be removed or reduced from certain repetition(s). FIG. 3 shows an example scenario 300 of DMRS reduction. In particular, part (A) of FIG. 3 shows DMRS configuration of Type-1/Type-B mapping/single-symbol, with a high DMRS overhead which is not needed to meet targeted URLLC performance. Part (B) of FIG. 3 shows DMRS sharing across mini-slots.

In an event that DMRS sharing is disabled, DMRS definition and configuration may continue using the specification (e.g., section 6.4.1 of Technical Specification (TS) 38.211) and additional DMRS may be transmitted according to the scheduling type and the duration (e.g., as specified in Table 6.4.1.1.3-3 of TS38.211 for frequency hopping disabled and specified in Table 6.4.1.1.3-6 of TS38.211 for frequency hopping enabled).

In an event that DMRS sharing is enabled, one possible solution to specify the DMRS density and the DMRS OS position may be to consider a group of repetitions as a single mini-slot. For instance, two mini-slots of two OS's each may be considered as a single mini-slot of four OS's, and the same specification (e.g., section 6.4.1 of TS38.211) may be re-used.

In an event that DMRS sharing is enabled, the number of resource elements (REs) for DMRS per physical resource block (PRB), $N_{DMRS}^{PRB}$, in the scheduled mini-slot may change from one repetition to the next. This may impact the TB size (TBS) determination and may lead to a different TBS calculated from one repetition to the next unless the used MCS has also changed from one repetition to the next and the new MCS is signaled to UE 110. However, in case there is only a single DCI scheduling the repetition, only a single MCS may be signaled to UE 110. Therefore, under a proposed scheme in accordance with the present disclosure, UE 110 may maintain the same TBS calculated from the DCI for all the repetitions scheduled by the same DCI. That is, UE 110 may assume no DMRS in the TBS calculation. The effective code rate may change from one repetition to another to exploit the REs freed from the DMRS overhead.

Illustrative Implementations

Figure 4:
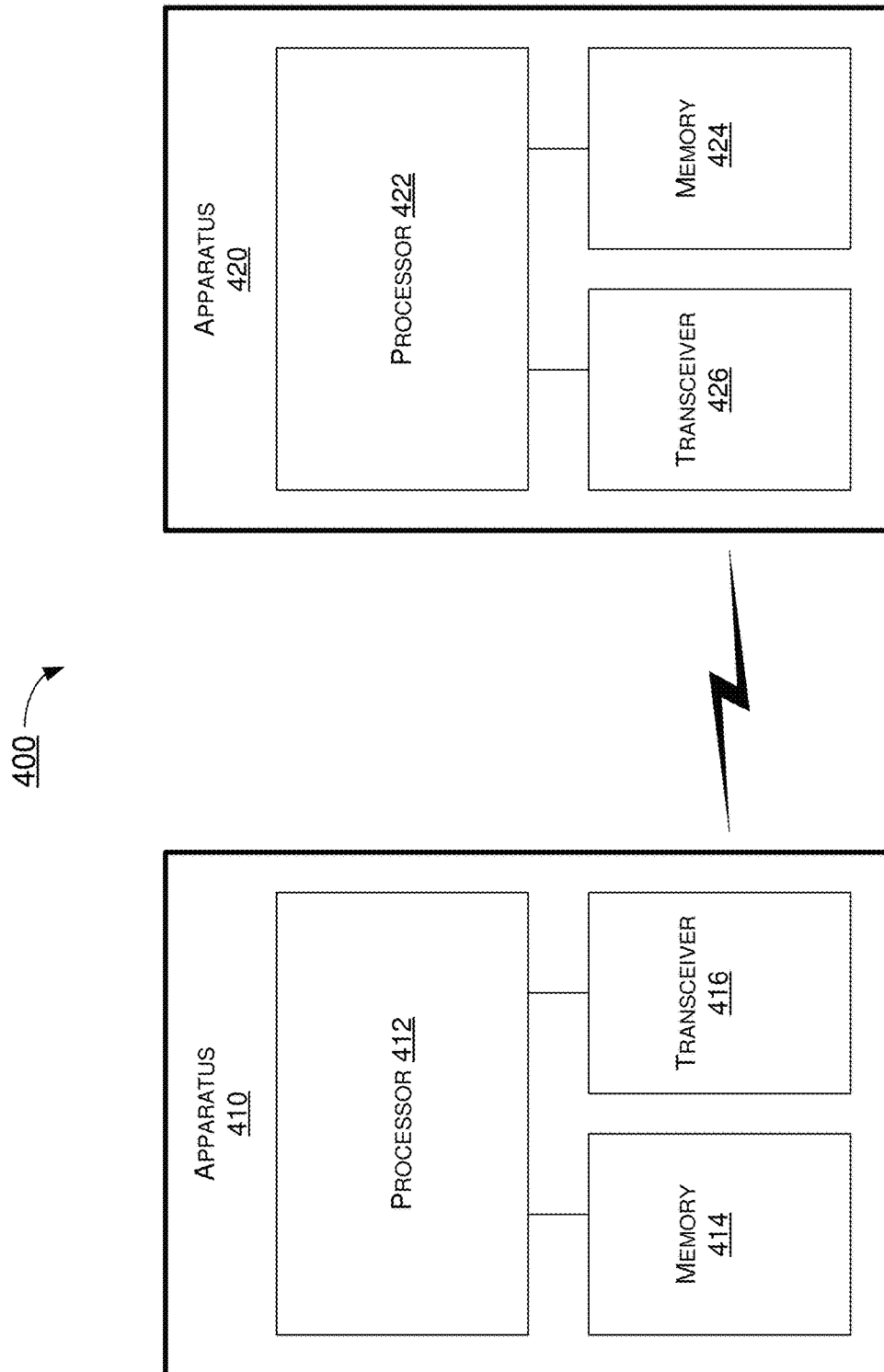
FIG. 4 is a block diagram of an example communication system in accordance with an implementation of the present disclosure.

FIG. 4 illustrates an example communication system 400 having an example apparatus 410 and an example apparatus 420 in accordance with an implementation of the present disclosure. Each of apparatus 410 and apparatus 420 may perform various functions to implement schemes, techniques, processes and methods described herein pertaining to enhancement of NR PUSCH for URLLC in mobile communications, including various schemes described above as well as processes described below.

Each of apparatus 410 and apparatus 420 may be a part of an electronic apparatus, which may be a UE such as a vehicle, a portable or mobile apparatus, a wearable apparatus, a wireless communication apparatus or a computing apparatus. For instance, each of apparatus 410 and apparatus 420 may be implemented in an electronic control unit (ECU) of a vehicle, a smartphone, a smartwatch, a personal digital assistant, a digital camera, or a computing equipment such as a tablet computer, a laptop computer or a notebook computer. Each of apparatus 410 and apparatus 420 may also be a part of a machine type apparatus, which may be an IoT or NB-IoT apparatus such as an immobile or a stationary apparatus, a home apparatus, a wire communication apparatus or a computing apparatus. For instance, each of apparatus 410 and apparatus 420 may be implemented in a smart thermostat, a smart fridge, a smart door lock, a wireless speaker or a home control center. Alternatively, each of apparatus 410 and apparatus 420 may be implemented in the form of one or more integrated-circuit (IC) chips such as, for example and without limitation, one or more single-core processors, one or more multi-core processors, one or more complex-instruction-set-computing (CISC) processors, or one or more reduced-instruction-set-computing (RISC) processors. Each of apparatus 410 and apparatus 420 may include at least some of those components shown in FIG. 4 such as a processor 412 and a processor 422, respectively. Each of apparatus 410 and apparatus 420 may further include one or more other components not pertinent to the proposed scheme of the present disclosure (e.g., internal power supply, display device and/or user interface device), and, thus, such component(s) of each of apparatus 410 and apparatus 420 are neither shown in FIG. 4 nor described below in the interest of simplicity and brevity.

In some implementations, at least one of apparatus 410 and apparatus 420 may be a part of an electronic apparatus, which may be a vehicle, a roadside unit (RSU), network node or base station (e.g., eNB, gNB or TRP), a small cell, a router or a gateway. For instance, at least one of apparatus 410 and apparatus 420 may be implemented in a vehicle in a vehicle-to-vehicle (V2V) or vehicle-to-everything (V2X) network, an eNodeB in an LTE, LTE-Advanced or LTE-Advanced Pro network or in a gNB in a 5G, NR, IoT or NB-IoT network. Alternatively, at least one of apparatus 410 and apparatus 420 may be implemented in the form of one or more IC chips such as, for example and without limitation, one or more single-core processors, one or more multi-core processors, or one or more CISC or RISC processors.

In one aspect, each of processor 412 and processor 422 may be implemented in the form of one or more single-core processors, one or more multi-core processors, or one or more CISC or RISC processors. That is, even though a singular term "a processor" is used herein to refer to processor 412 and processor 422, each of processor 412 and processor 422 may include multiple processors in some implementations and a single processor in other implementations in accordance with the present disclosure. In another aspect, each of processor 412 and processor 422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 412 and processor 422 is a special-purpose machine specifically designed, arranged and configured to perform specific tasks including enhancement of NR PUSCH for URLLC in mobile communications in accordance with various implementations of the present disclosure.

In some implementations, apparatus 410 may also include a wireless transceiver 416 coupled to processor 412 and capable of wirelessly transmitting and receiving data over a wireless link (e.g., a 3GPP connection or a non-3GPP connection). In some implementations, apparatus 410 may further include a memory 414 coupled to processor 412 and capable of being accessed by processor 412 and storing data therein. In some implementations, apparatus 420 may also include a wireless transceiver 426 coupled to processor 422 and capable of wirelessly transmitting and receiving data over a wireless link (e.g., a 3GPP connection or a non-3GPP connection). In some implementations, apparatus 420 may further include a memory 424 coupled to processor 422 and capable of being accessed by processor 422 and storing data therein. Accordingly, apparatus 410 and apparatus 420 may wirelessly communicate with each other via transceiver 416 and transceiver 426, respectively.

To aid better understanding, the following description of the operations, functionalities and capabilities of each of apparatus 410 and apparatus 420 is provided in the context of an NR communication environment in which apparatus 410 is implemented in or as a wireless communication device, a communication apparatus, a UE or an IoT device (e.g., UE 110) and apparatus 420 is implemented in or as a base station or network node (e.g., network node 125).

In one aspect of enhancement of NR PUSCH for URLLC in mobile communications in accordance with the present disclosure, processor 412 of apparatus 410 may determine whether to apply a CDD scheme (e.g., non-transparent CDD) for a PUSCH transmission. Additionally, processor 412 may perform, via transceiver 416, the PUSCH transmission to apparatus 420 as a network node (e.g., network node 125) of a wireless network (e.g., wireless network 120) with the CDD scheme applied responsive to determining that the CDD scheme is to be applied.

In some implementations, in determining whether to apply the CDD scheme, processor 412 may determine to apply the CDD scheme to enhance UL transmission diversity in an event that the PUSCH transmission is a part of an URLLC.

In some implementations, in determining whether to apply the CDD scheme, processor 412 may determine to apply the CDD scheme in case of a grant-based or configured grant.

In some implementations, in determining whether to apply the CDD scheme, processor 412 may determine to apply the CDD scheme to achieve a target reliability. In some implementations, in determining to apply the CDD scheme to achieve the target reliability, processor 412 may determine to apply the CDD scheme to achieve a BLER lower than or equal to a BLER threshold. In some implementations, in determining whether to apply the CDD scheme, processor 412 may determine to apply the CDD scheme in an event that a specific MCS table of a plurality of MCS tables is used for the PUSCH transmission. In some implementations, the specific MCS table of the plurality of MCS tables may include an MCS table for an URLLC.

In some implementations, in determining whether to apply the CDD scheme, processor 412 may determine to apply the CDD scheme in an event that a specific RNTI of a plurality of RNTIs is used for the PUSCH transmission.

In some implementations, in determining whether to apply the CDD scheme, processor 412 may determine to apply the CDD scheme in an event that a new modulation coding scheme radio network temporary identifier (MCS-RNTI) is used for the PUSCH transmission.

In some implementations, in determining whether to apply the CDD scheme, processor 412 may determine whether apparatus 410, implemented in a UE (e.g., UE 110), is configured with a capability of applying the CDD scheme for UL transmissions.

In some implementations, processor 412 may perform additional operations. For instance, processor 412 may receive, via transceiver 416, a signaling from apparatus 420 indicating information related to mini-slot repetition. In such cases, in performing the PUSCH transmission, processor 412 may perform the PUSCH transmission with at least one symbol repeated in multiple mini-slots within a slot.

In some implementations, in receiving the signaling, processor 412 may receive an RRC signaling with the information related to mini-slot repetition indicated by a new parameter defined in Rel-16 of the 3GPP specification or an existing parameter defined in Rel-15 of the 3GPP specification.

In some implementations, processor 412 may perform additional operations. For instance, processor 412 may perform a TBS calculation for the PUSCH transmission with an assumption of no DMRS in the TBS calculation by maintaining a same TBS calculated from a DCI signaling for all repetitions scheduled by the DCI signaling.

In another aspect of enhancement of NR PUSCH for URLLC in mobile communications in accordance with the present disclosure, processor 412 of apparatus 410 may receive, via transceiver 416, a signaling from apparatus 420 as a network node (e.g., network node 125) of a wireless network (e.g., wireless network 120) indicating information related to mini-slot repetition. Moreover, processor 412 may perform, via transceiver 416, a PUSCH transmission to apparatus 420 with at least one symbol repeated in multiple mini-slots within a slot.

In some implementations, in receiving the signaling, processor 412 may receive an RRC signaling with the information related to mini-slot repetition indicated by a new parameter defined in Rel-16 of the 3GPP specification or an existing parameter defined in Rel-15 of the 3GPP specification.

In some implementations, processor 412 may perform additional operations. For instance, processor 412 may determine whether to apply a CDD scheme (e.g., non-transparent CDD) for the PUSCH transmission. In such cases, in performing the PUSCH transmission, processor 412 may perform the PUSCH transmission with the CDD scheme applied responsive to determining that the CDD scheme is to be applied.

In some implementations, in determining whether to apply the CDD scheme, processor 412 may perform one of the following: (i) determining to apply the CDD scheme to enhance UL transmission diversity in an event that the PUSCH transmission is a part of an URLLC; (ii) determining to apply the CDD scheme in case of a grant-based or configured grant; (iii) determining to apply the CDD scheme to achieve a target reliability; (iv) determining to apply the CDD scheme in an event that a specific MCS table of a plurality of MCS tables is used for the PUSCH transmission; (v) determining to apply the CDD scheme in an event that a specific RNTI of a plurality of RNTIs is used for the PUSCH transmission; (vi) determining to apply the CDD scheme in an event that a new MCS-RNTI is used for the PUSCH transmission; and (vii) determining whether apparatus 410, implemented in a UE (e.g., UE 110), is configured with a capability of applying the CDD scheme for UL transmissions.

In some implementations, in determining to apply the CDD scheme to achieve the target reliability, processor 412 may determine to apply the CDD scheme to achieve a BLER lower than or equal to a BLER threshold. In some implementations, the specific MCS table of the plurality of MCS tables may include an MCS table for the URLLC.

In some implementations, processor 412 may perform additional operations. For instance, processor 412 may perform, by the processor, a TBS calculation for the PUSCH transmission with an assumption of no DMRS in the TBS calculation by maintaining a same TBS calculated from a DCI signaling for all repetitions scheduled by the DCI signaling.

In yet another aspect of enhancement of NR PUSCH for URLLC in mobile communications in accordance with the present disclosure, processor 412 of apparatus 410 may determine whether to apply a CDD scheme (e.g., non-transparent CDD) for a PUSCH transmission. Additionally, processor 412 may receive, via transceiver 416, a signaling from apparatus 420 as a network node (e.g., network node 125) of a wireless network (e.g., wireless network 120) indicating information related to mini-slot repetition. Moreover, processor 412 may perform a TBS calculation for the PUSCH transmission with an assumption of no DMRS in the TBS calculation. Furthermore, processor 412 may perform, via transceiver 416, the PUSCH transmission to apparatus 420 with the CDD scheme applied in response to determining that the CDD scheme is to be applied.

In some implementations, in performing the PUSCH transmission, processor 412 may perform the PUSCH transmission with at least one symbol repeated in multiple mini-slots within a slot.

Illustrative Processes

FIG. 5 illustrates an example process 500 in accordance with an implementation of the present disclosure. Process 500 may be an example implementation of the proposed schemes described above with respect to enhancement of NR PUSCH for URLLC in mobile communications in accordance with the present disclosure. Process 500 may represent an aspect of implementation of features of apparatus 410 and apparatus 420. Process 500 may include one or more operations, actions, or functions as illustrated by one or more of blocks 510 and 520. Although illustrated as discrete blocks, various blocks of process 500 may be divided into additional blocks, combined into fewer blocks, or eliminated, depending on the desired implementation. Moreover, the blocks of process 500 may executed in the order shown in FIG. 5 or, alternatively, in a different order. Process 500 may also be repeated partially or entirely. Process 500 may be implemented by apparatus 410, apparatus 420 and/or any suitable wireless communication device, UE, RSU, base station or machine type devices. Solely for illustrative purposes and without limitation, process 500 is described below in the context of apparatus 410 as UE 110 and apparatus 420 as network node 125. Process 500 may begin at block 510.

At 510, process 500 may involve processor 412 of apparatus 410 determining whether to apply a CDD scheme (e.g., non-transparent CDD) for a PUSCH transmission. Process 500 may proceed from 510 to 520.

At 520, process 500 may involve processor 412 performing, via transceiver 416, the PUSCH transmission to apparatus 420 as a network node (e.g., network node 125) of a wireless network (e.g., wireless network 120) with the CDD scheme applied responsive to determining that the CDD scheme is to be applied.

In some implementations, in determining whether to apply the CDD scheme, process 500 may involve processor 412 determining to apply the CDD scheme to enhance UL transmission diversity in an event that the PUSCH transmission is a part of an URLLC.

In some implementations, in determining whether to apply the CDD scheme, process 500 may involve processor 412 determining to apply the CDD scheme in case of a grant-based or configured grant.

In some implementations, in determining whether to apply the CDD scheme, process 500 may involve processor 412 determining to apply the CDD scheme to achieve a target reliability. In some implementations, in determining to apply the CDD scheme to achieve the target reliability, process 500 may involve processor 412 determining to apply the CDD scheme to achieve a BLER lower than or equal to a BLER threshold.

In some implementations, in determining whether to apply the CDD scheme, process 500 may involve processor 412 determining to apply the CDD scheme in an event that a specific MCS table of a plurality of MCS tables is used for the PUSCH transmission. In some implementations, the specific MCS table of the plurality of MCS tables may include an MCS table for an URLLC.

In some implementations, in determining whether to apply the CDD scheme, process 500 may involve processor 412 determining to apply the CDD scheme in an event that a specific RNTI of a plurality of RNTIs is used for the PUSCH transmission.

In some implementations, in determining whether to apply the CDD scheme, process 500 may involve processor 412 determining to apply the CDD scheme in an event that a new modulation coding scheme radio network temporary identifier (MCS-RNTI) is used for the PUSCH transmission.

In some implementations, in determining whether to apply the CDD scheme, process 500 may involve processor 412 determining whether apparatus 410, implemented in a UE (e.g., UE 110), is configured with a capability of applying the CDD scheme for UL transmissions.

In some implementations, process 500 may involve processor 412 performing additional operations. For instance, process 500 may involve processor 412 receiving, via transceiver 416, a signaling from apparatus 420 indicating information related to mini-slot repetition. In such cases, in performing the PUSCH transmission, process 500 may involve processor 412 performing the PUSCH transmission with at least one symbol repeated in multiple mini-slots within a slot.

In some implementations, in receiving the signaling, process 500 may involve processor 412 receiving an RRC signaling with the information related to mini-slot repetition indicated by a new parameter defined in Rel-16 of the 3GPP specification or an existing parameter defined in Rel-15 of the 3GPP specification.

In some implementations, process 500 may involve processor 412 performing additional operations. For instance, process 500 may involve processor 412 performing a TBS calculation for the PUSCH transmission with an assumption of no DMRS in the TBS calculation by maintaining a same TBS calculated from a DCI signaling for all repetitions scheduled by the DCI signaling.

Figure 6:
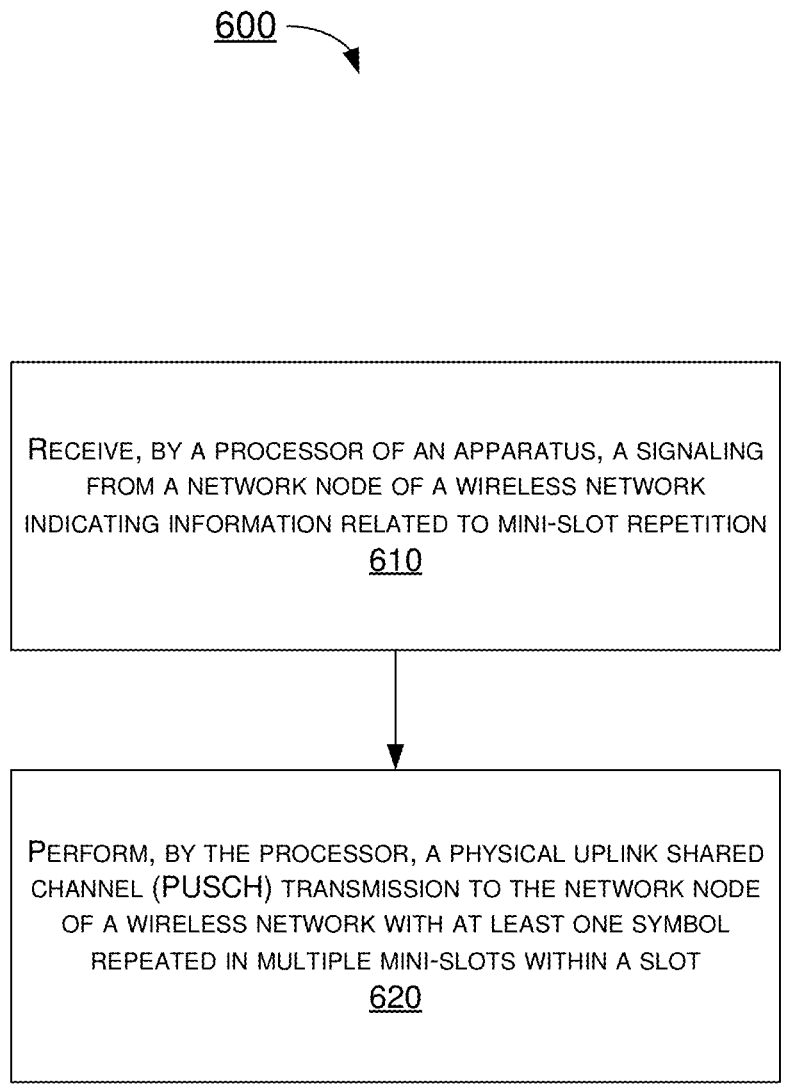
FIG. 6 is a flowchart of an example process in accordance with an implementation of the present disclosure.

FIG. 6 illustrates an example process 600 in accordance with an implementation of the present disclosure. Process 600 may be an example implementation of the proposed schemes described above with respect to enhancement of NR PUSCH for URLLC in mobile communications in accordance with the present disclosure. Process 600 may represent an aspect of implementation of features of apparatus 410 and apparatus 420. Process 600 may include one or more operations, actions, or functions as illustrated by one or more of blocks 610 and 620. Although illustrated as discrete blocks, various blocks of process 600 may be divided into additional blocks, combined into fewer blocks, or eliminated, depending on the desired implementation. Moreover, the blocks of process 600 may executed in the order shown in FIG. 6 or, alternatively, in a different order. Process 600 may also be repeated partially or entirely. Process 600 may be implemented by apparatus 410, apparatus 420 and/or any suitable wireless communication device, UE, RSU, base station or machine type devices. Solely for illustrative purposes and without limitation, process 600 is described below in the context of apparatus 410 as UE 110 and apparatus 420 as network node 125. Process 600 may begin at block 610.

At 610, process 600 may involve processor 412 of apparatus 410 receiving, via transceiver 416, a signaling from apparatus 420 as a network node (e.g., network node 125) of a wireless network (e.g., wireless network 120) indicating information related to mini-slot repetition. Process 600 may proceed from 610 to 620.

At 620, process 600 may involve processor 412 performing, via transceiver 416, a PUSCH transmission to apparatus 420 with at least one symbol repeated in multiple mini-slots within a slot.

In some implementations, in receiving the signaling, process 600 may involve processor 412 receiving an RRC signaling with the information related to mini-slot repetition indicated by a new parameter defined in Rel-16 of the 3GPP specification or an existing parameter defined in Rel-15 of the 3GPP specification.

In some implementations, process 600 may involve processor 412 performing additional operations. For instance, process 600 may involve processor 412 determining whether to apply a CDD scheme (e.g., non-transparent CDD) for the PUSCH transmission. In such cases, in performing the PUSCH transmission, process 600 may involve processor 412 performing the PUSCH transmission with the CDD scheme applied responsive to determining that the CDD scheme is to be applied.

In some implementations, in determining whether to apply the CDD scheme, process 600 may involve processor 412 performing one of the following: (i) determining to apply the CDD scheme to enhance UL transmission diversity in an event that the PUSCH transmission is a part of an URLLC; (ii) determining to apply the CDD scheme in case of a grant-based or configured grant; (iii) determining to apply the CDD scheme to achieve a target reliability; (iv) determining to apply the CDD scheme in an event that a specific MCS table of a plurality of MCS tables is used for the PUSCH transmission; (v) determining to apply the CDD scheme in an event that a specific RNTI of a plurality of RNTIs is used for the PUSCH transmission; (vi) determining to apply the CDD scheme in an event that a new MCS-RNTI is used for the PUSCH transmission; and (vii) determining whether apparatus 410, implemented in a UE (e.g., UE 110), is configured with a capability of applying the CDD scheme for UL transmissions.

In some implementations, in determining to apply the CDD scheme to achieve the target reliability, process 600 may involve processor 412 determining to apply the CDD scheme to achieve a BLER lower than or equal to a BLER threshold. In some implementations, the specific MCS table of the plurality of MCS tables may include an MCS table for the URLLC.

In some implementations, process 600 may involve processor 412 performing additional operations. For instance, process 600 may involve processor 412 performing, by the processor, a TBS calculation for the PUSCH transmission with an assumption of no DMRS in the TBS calculation by maintaining a same TBS calculated from a DCI signaling for all repetitions scheduled by the DCI signaling.

Figure 7:
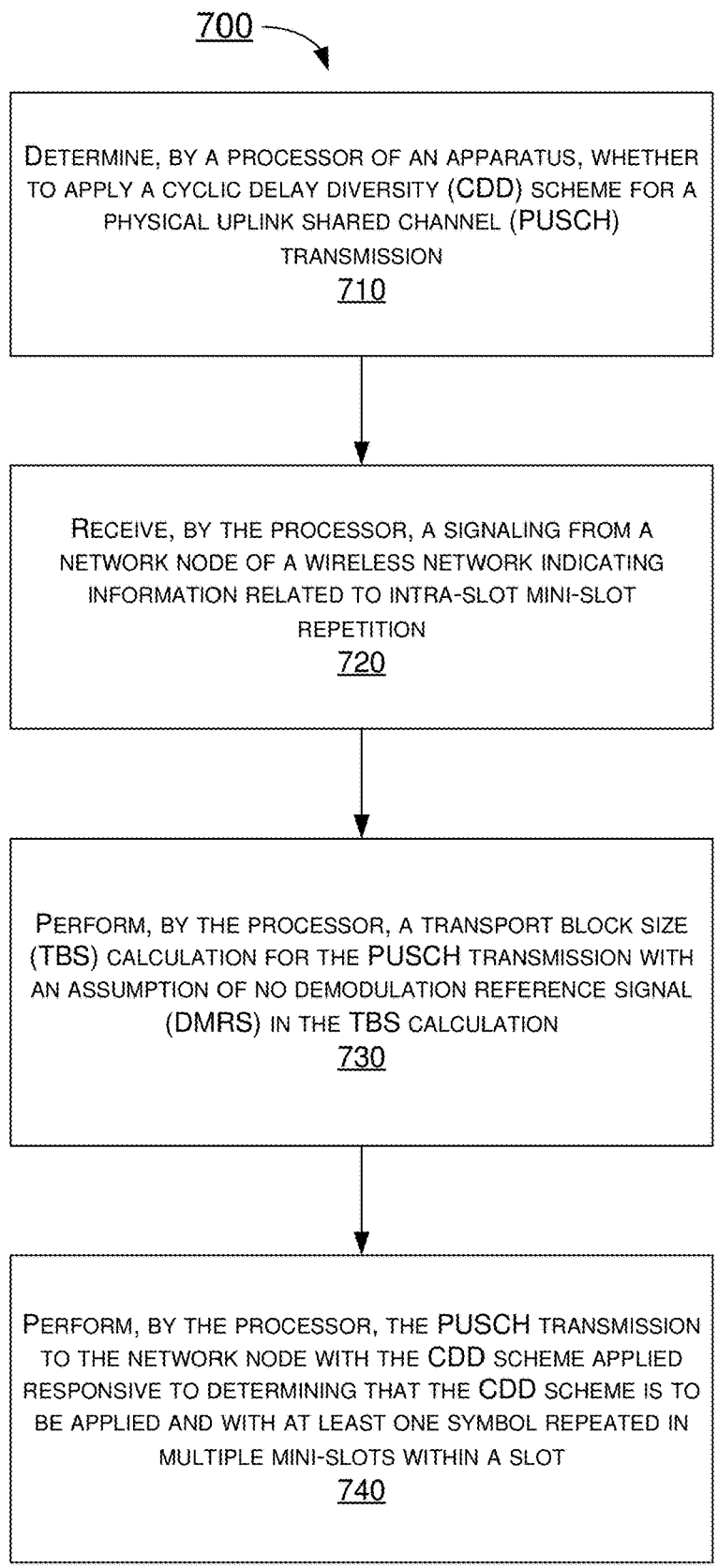
FIG. 7 is a flowchart of an example process in accordance with an implementation of the present disclosure.

FIG. 7 illustrates an example process 700 in accordance with an implementation of the present disclosure. Process 700 may be an example implementation of the proposed schemes described above with respect to enhancement of NR PUSCH for URLLC in mobile communications in accordance with the present disclosure. Process 700 may represent an aspect of implementation of features of apparatus 410 and apparatus 420. Process 700 may include one or more operations, actions, or functions as illustrated by one or more of blocks 710, 720, 730 and 740. Although illustrated as discrete blocks, various blocks of process 700 may be divided into additional blocks, combined into fewer blocks, or eliminated, depending on the desired implementation. Moreover, the blocks of process 700 may executed in the order shown in FIG. 7 or, alternatively, in a different order. Process 700 may also be repeated partially or entirely. Process 700 may be implemented by apparatus 410, apparatus 420 and/or any suitable wireless communication device, UE, RSU, base station or machine type devices. Solely for illustrative purposes and without limitation, process 700 is described below in the context of apparatus 410 as UE 110 and apparatus 420 as network node 125. Process 700 may begin at block 710.

At 710, process 700 may involve processor 412 of apparatus 410 determining whether to apply a CDD scheme (e.g., non-transparent CDD) for a PUSCH transmission. Process 700 may proceed from 710 to 720.

At 720, process 700 may involve processor 412 receiving, via transceiver 416, a signaling from apparatus 420 as a network node (e.g., network node 125) of a wireless network (e.g., wireless network 120) indicating information related to mini-slot repetition. Process 700 may proceed from 720 to 730.

At 730, process 700 may involve processor 412 performing a TBS calculation for the PUSCH transmission with an assumption of no DMRS in the TBS calculation. Process 700 may proceed from 730 to 740.

At 740, process 700 may involve processor 412 performing, via transceiver 416, the PUSCH transmission to apparatus 420 with the CDD scheme applied in response to determining that the CDD scheme is to be applied.

In some implementations, in performing the PUSCH transmission, process 700 may involve processor 412 performing the PUSCH transmission with at least one symbol repeated in multiple mini-slots within a slot.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   determining, by a processor of an apparatus, whether to apply a cyclic delay diversity (CDD) scheme for a physical uplink shared channel (PUSCH) transmission; and
   performing, by the processor, the PUSCH transmission to a network node of a wireless network with the CDD scheme applied responsive to determining that the CDD scheme is to be applied,
   wherein the determining of whether to apply the CDD scheme comprises determining to apply the CDD scheme to achieve a block error rate (BLER) lower than or equal to a BLER threshold.

2. The method of claim 1, wherein the determining of whether to apply the CDD scheme further comprises determining to apply the CDD scheme to enhance uplink (UL) transmission diversity in an event that the PUSCH transmission is a part of an ultra-reliable low-latency communication (URLLC).

3. The method of claim 1, wherein the determining of whether to apply the CDD scheme further comprises determining to apply the CDD scheme in case of a grant-based or configured grant.

4. The method of claim 1, wherein the determining of whether to apply the CDD scheme further comprises determining to apply the CDD scheme in an event that a specific modulation coding scheme (MCS) table of a plurality of MCS tables is used for the PUSCH transmission.

5. The method of claim 4, wherein the specific MCS table of the plurality of MCS tables comprises an MCS table for an ultra-reliable low-latency communication (URLLC).

6. The method of claim 1, wherein the determining of whether to apply the CDD scheme further comprises determining to apply the CDD scheme in an event that a specific radio network temporary identifier (RNTI) of a plurality of RNTIs is used for the PUSCH transmission.

7. The method of claim 1, wherein the determining of whether to apply the CDD scheme further comprises determining to apply the CDD scheme in an event that a new modulation coding scheme radio network temporary identifier (MCS-RNTI) is used for the PUSCH transmission.

8. The method of claim 1, wherein the determining of whether to apply the CDD scheme further comprises determining whether the apparatus, implemented in a user equipment (UE), is configured with a capability of applying the CDD scheme for uplink (UL) transmissions.

9. The method of claim 1, further comprising:
receiving, by the processor, a signaling from the network node indicating information related to mini-slot repetition,
wherein the performing of the PUSCH transmission comprises performing the PUSCH transmission with at least one symbol repeated in multiple mini-slots within a slot.

10. The method of claim 9, wherein the receiving of the signaling comprises receiving a radio resource control (RRC) signaling with the information related to mini-slot repetition indicated by a new parameter defined in Release 16 (Rel-16) of a 3$^{rd}$ Generation Partnership Project (3GPP) specification or an existing parameter defined in Release 15 (Rel-15) of the 3GPP specification.

11. The method of claim 1, further comprising:
performing, by the processor, a transport block size (TBS) calculation for the PUSCH transmission with an assumption of no demodulation reference signal (DMRS) in the TBS calculation by maintaining a same TBS calculated from a DCI signaling for all repetitions scheduled by the DCI signaling.

12. A method, comprising:
receiving, by a processor of an apparatus, a signaling from a network node of a wireless network indicating information related to mini-slot repetition; and
performing, by the processor, a physical uplink shared channel (PUSCH) transmission to the network node with at least one symbol repeated in multiple mini-slots within a slot,
wherein the receiving of the signaling comprises receiving a radio resource control (RRC) signaling with the information related to mini-slot repetition indicated by a new parameter defined in Release 16 (Rel-16) of a 3$^{rd}$ Generation Partnership Project (3GPP) specification or an existing parameter defined in Release 15 (Rel-15) of the 3GPP specification.

13. The method of claim 12, further comprising:
determining, by the processor, whether to apply a cyclic delay diversity (CDD) scheme for the PUSCH transmission,
wherein the performing of the PUSCH transmission comprises performing the PUSCH transmission with the CDD scheme applied responsive to determining that the CDD scheme is to be applied.

14. The method of claim 13, wherein the determining of whether to apply the CDD scheme comprises performing one of:

determining to apply the CDD scheme to enhance uplink (UL) transmission diversity in an event that the PUSCH transmission is a part of an ultra-reliable low-latency communication (URLLC);
determining to apply the CDD scheme in case of a grant-based or configured grant;
determining to apply the CDD scheme to achieve a target reliability;
determining to apply the CDD scheme in an event that a specific modulation coding scheme (MCS) table of a plurality of MCS tables is used for the PUSCH transmission;
determining to apply the CDD scheme in an event that a specific radio network temporary identifier (RNTI) of a plurality of RNTIs is used for the PUSCH transmission;
determining to apply the CDD scheme in an event that a new modulation coding scheme radio network temporary identifier (MCS-RNTI) is used for the PUSCH transmission; and
determining whether the apparatus, implemented in a user equipment (UE), is configured with a capability of applying the CDD scheme for UL transmissions.

15. The method of claim 14, wherein the determining to apply the CDD scheme to achieve the target reliability comprises determining to apply the CDD scheme to achieve a block error rate (BLER) lower than or equal to a BLER threshold, and wherein the specific MCS table of the plurality of MCS tables comprises an MCS table for the URLLC.

16. The method of claim 12, further comprising:
performing, by the processor, a transport block size (TBS) calculation for the PUSCH transmission with an assumption of no demodulation reference signal (DMRS) in the TBS calculation by maintaining a same TBS calculated from a DCI signaling for all repetitions scheduled by the DCI signaling.

17. A method, comprising:
determining, by a processor of an apparatus, whether to apply a cyclic delay diversity (CDD) scheme for a physical uplink shared channel (PUSCH) transmission;
receiving, by the processor, a signaling from a network node of a wireless network indicating information related to mini-slot repetition;
performing, by the processor, a transport block size (TBS) calculation for the PUSCH transmission with an assumption of no demodulation reference signal (DMRS) in the TBS calculation; and
performing, by the processor, the PUSCH transmission to the network node with the CDD scheme applied responsive to determining that the CDD scheme is to be applied,
wherein the performing of the PUSCH transmission comprises performing the PUSCH transmission with at least one symbol repeated in multiple mini-slots within a slot, and
wherein the determining of whether to apply the CDD scheme comprises determining to apply the CDD scheme to achieve a block error rate (BLER) lower than or equal to a BLER threshold.

* * * * *